United States Patent
Pehkonen et al.

(10) Patent No.: US 7,351,387 B2
(45) Date of Patent: Apr. 1, 2008

(54) METHOD FOR REMOVING IMPURITIES ACCUMULATED IN A SCRUBBING FLUID

(75) Inventors: Oiva Pehkonen, Ylöjärvi (FI); Tarja Korhonen, Ylöjärvi (FI); Pertti Oittinen, Västilä (FI); Markku Helin, Tampere (FI)

(73) Assignee: Kvaerner Power Oy, Tampere (FI)

( * ) Notice: Subject to any disclaimer, the term of this patent is extended or adjusted under 35 U.S.C. 154(b) by 0 days.

(21) Appl. No.: 10/570,321

(22) PCT Filed: Sep. 8, 2004

(86) PCT No.: PCT/FI2004/050129

§ 371 (c)(1),
(2), (4) Date: Mar. 2, 2006

(87) PCT Pub. No.: WO2005/023397

PCT Pub. Date: Mar. 17, 2005

(65) Prior Publication Data

US 2007/0014712 A1    Jan. 18, 2007

(30) Foreign Application Priority Data

Sep. 10, 2003 (FI) .................................. 20031296

(51) Int. Cl.
*B01D 37/00* (2006.01)
*B01D 53/50* (2006.01)
*C01F 11/46* (2006.01)

(52) U.S. Cl. ........................... 423/243.01; 423/243.08; 423/243.09; 423/243.1; 423/555; 210/198.1; 210/600; 210/767

(58) Field of Classification Search ........... 423/243.01, 423/243.08, 243.09, 243.1, 555; 210/600, 210/767, 198.1
See application file for complete search history.

(56) References Cited

U.S. PATENT DOCUMENTS

| 4,741,890 | A |   | 5/1988 | Rose et al. |
| 4,869,885 | A |   | 9/1989 | Lin et al. |
| 4,891,195 | A |   | 1/1990 | Lin |
| 7,037,434 | B2 | * | 5/2006 | Myers et al. ............ 210/718 |

FOREIGN PATENT DOCUMENTS

| JP | 6-256015 A | * | 9/1994 |
| WO | WO 8705530 |   | 9/1987 |

OTHER PUBLICATIONS

Roger Grant et al. (editors) "Grant and Hackh's Chemical Dictionary" 5th Ed., (1987) McGraw-Hill Book Co. USA, ISBN 0-07-024067-1, p. 178.*

* cited by examiner

*Primary Examiner*—Timothy C. Vanoy
(74) *Attorney, Agent, or Firm*—Venable LLP; Eric J. Franklin

(57) ABSTRACT

A method for removing impurities accumulated in a scrubbing fluid in a flue gas scrubber and effluents from the scrubber. The flue gases are scrubbed with a scrubbing fluid that includes a calcium-containing absorbent. The scrubbing fluid containing gypsum and other impurities and produced in the scrubber is discharged from the scrubber. The gypsum is separated from the scrubbing fluid. To the scrubbing fluid is added an auxiliary agent, by the effect of which the impurities accumulated in the scrubbing fluid are removed with the gypsum and the moisture content of the gypsum to be separated from the scrubbing fluid is increased.

14 Claims, 1 Drawing Sheet

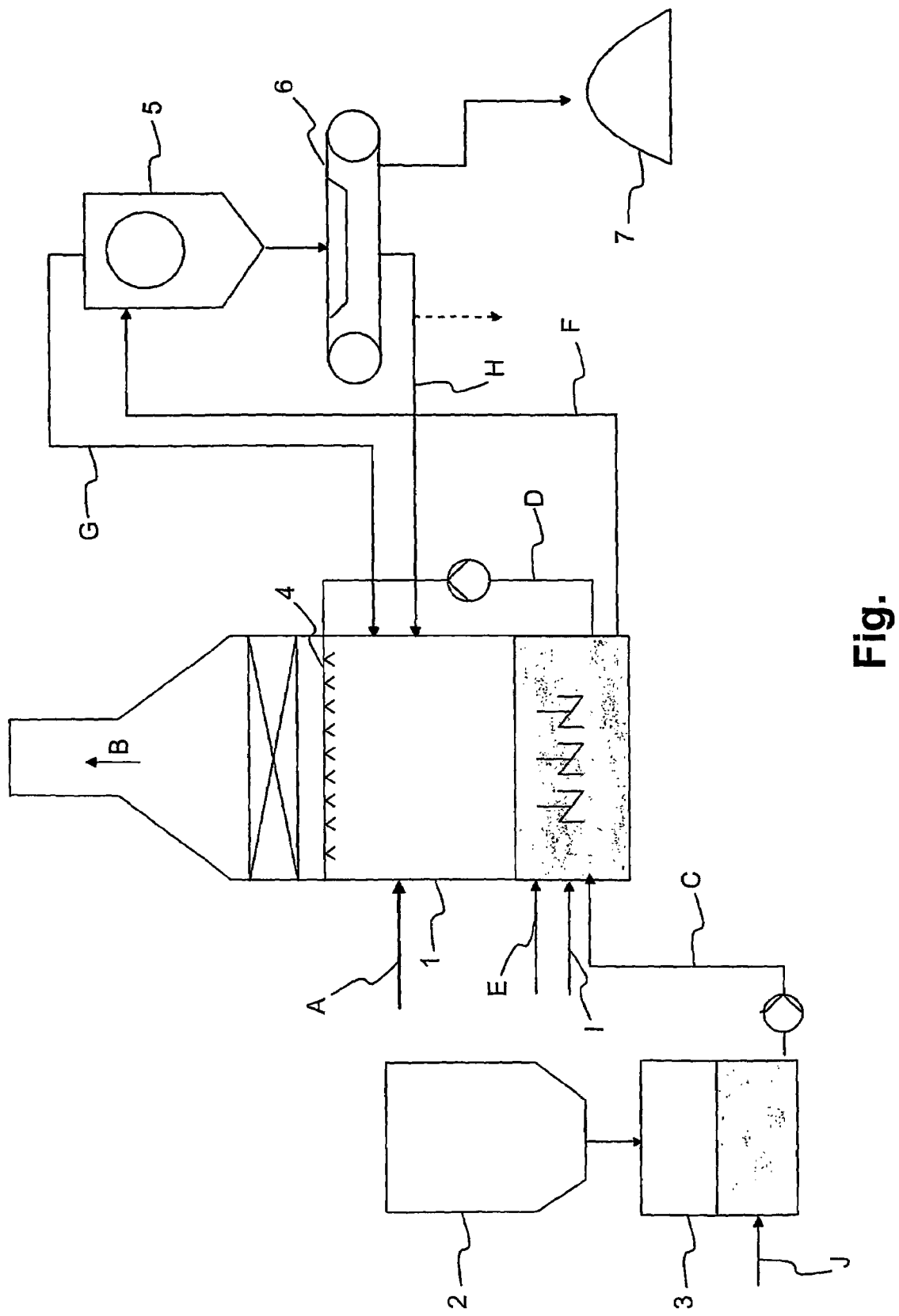

METHOD FOR REMOVING IMPURITIES ACCUMULATED IN A SCRUBBING FLUID

CROSS-REFERENCE TO RELATED APPLICATIONS

This application claims priority to Finnish patent application no. 20031296 filed 10 Sep. 2003 and is the national phase under 35 U.S.C. § 371 of PCT/FI2004/050129.

FIELD OF THE INVENTION

The invention relates to a method for removing impurities accumulated in the scrubbing fluid in a flue gas scrubber.

BACKGROUND OF THE INVENTION

In power plants, flue gases from fuel often contain gaseous sulphuric oxides ($SO_x$) because of sulphur compounds contained in the fuel. These flue gases are scrubbed with a gas scrubber, i.e. an absorber, in which sulphur dioxide is removed with a scrubbing fluid by using an absorbent in the scrubbing fluid, which absorbent reacts with the sure phur dioxide. Limestone-based scrubbers are based on the fact that the sulphur oxides entrained in the flue gases react with calcium carbonate and form calcium sulphite, which is oxidized to calcium sulphate (gypsum) by the effect of oxygen contained in the flue gases and forced oxidation. After this, the gypsum can be separated from the fluid and the fluid can be recycled to the scrubber.

Limestone scrubbers are advantageous to use because of their low operating costs (cheap absorbent). However, problems have been caused by the detection of foaming and cumulation of the foam in the limestone scrubber in diesel power plants and in other power plants. Entrained in the flue gases of a diesel power plant are lubricant residues and soot which, together with bubbles of the oxidation air, easily form an oily foam onto the fluid surface of the scrubber. The foaming is also affected by the quality of the water used in the scrubbing fluid. Because of the recirculation of the scrubbing fluid, some foam is also continuously recycled to the scrubber because it will not separate in a gypsum separator. As a result, the amount of foam on the fluid surface of the scrubber increases.

In power industry, it is possible to use a conventional solution to the problem of foaming: the use of anti-foam agent. However, anti-foam agents are expensive and thereby increase the operating costs of the scrubber.

It is also known to remove foam from the scrubbing fluid in a special container after the scrubber. The foam can be removed, for example, in an excess tank of a hydrocyclone, to which the scrubbing fluid separated from the gypsum is led. In the tank, the foam separates as a phase of its own onto the surface of the fluid and is removed from the fluid circulation by physical methods without chemicals. This arrangement is functional as such, but in all situations it is not possible or economically reasonable to construct such an apparatus in a power plant.

Soot and lubricant residues entrained in with the flue gases of a diesel power plant mix in the gypsum to be removed from the flue gas scrubber, colouring the gypsum dark, wherein it cannot be utilized in the gypsum board industry. Furthermore, with the flue gas and the raw water, impurities dissolving in the scrubbing fluid also enter the process, and these impurities are removed from the scrubber both as moisture in the gypsum and as waste water. With the flue gases and the raw water, e.g. chlorides and fluorides enter the process, causing corrosion in the scrubber.

BRIEF DESCRIPTION OF THE INVENTION

It is an aim of the present invention to provide a method for overcoming the above-presented problems and removing the impurities accumulated in the scrubbing fluid in the flue gas scrubber from the scrubber with the gypsum produced as a result of a desulphurization reaction in a simple way and without auxiliary equipment. Another aim is to provide a method by which the limestone scrubber process of a diesel power plant is made waste water free.

The invention is based on the idea that to the scrubbing fluid to be supplied into the scrubber is added an auxiliary agent, having the effect of causing the impurities accumulated in the scrubbing fluid, i.e., the foam accumulated in the scrubbing fluid and the small particles adhered to it, to mix with the scrubbing fluid and to be discharged with the gypsum to be separated from the process. The auxiliary agent to be used is a solution or a powderized substance which contains surfactants. Pilot tests have shown that mixtures containing; anionic and amphoteric active agents, i.e. tensides, are particularly applicable. These include for example detergents. Thus, the surprising finding was made in the tests that ordinary detergents for cleaning and washing used in households are most useful as auxiliary agents for the scrubber. When auxiliary agents are added in the scrubbing fluid, the light foam possibly floating on the surface of the fluid and the small particles adhered to it can be transferred to the solution, wherein foaming in the scrubber is reduced. The auxiliary agent also prevents foaming.

Furthermore, the auxiliary agents have an effect on the infiltration capacity of the gypsum to be separated, in such a way that the gypsum can absorb more moisture and thus be moister when removed from the process. Thanks to this, a higher content of soluble impurities in the scrubbing fluid, such as chlorides and fluorides, can be removed with the gypsum than before. The moister the gypsum is when it is discharged from the process, the more soluble impurities are removed from the process. However, the aim is to discharge the gypsum as a solid cake from the process. The addition of the auxiliary agent makes it possible to increase the moisture content of the gypsum in a controlled way to be as high as possible, but to keep the gypsum in a cake and thus easily handled. The moisture content of the gypsum is thus 10 to 20%. By means of the auxiliary agent, the limestone process of a diesel power plant can be made almost waste water free.

BRIEF DESCRIPTION OF THE DRAWING

In the following, the invention will be described in more detail with reference to the appended drawing which shows schematically an application of the invention in a flue gas scrubber.

DETAILED DESCRIPTION OF THE INVENTION

In this invention, impurities accumulated in the scrubbing fluid of a flue gas scrubber refer to impurities accumulated in the scrubbing fluid as a result of scrubbing in the scrubber; that is, foam and small particles adhered to it, such as soot and lubricant residues, as well as chlorides and/or fluorides dissolved in the scrubbing fluid.

The figure is a general process chart showing a desulphuration unit for flue gases in a diesel power plant, the unit including a gas scrubber 1, whose operating principle is known as such and to which flue gases from fuel combustion are led from diesel engines (arrow A) and from which the scrubbed flue gases are discharged via a waste flue (arrow B). In this context, the gas scrubber 1 refers to an actual scrubber tower where the flue gases and the scrubbing fluid are brought in contact with each other and in whose lower part the scrubbing fluid accumulates. The gas scrubber 1 is a limestone-based scrubber. From a limestone silo 2, limestone is supplied in a powder form to a limestone slurry tank 3, from which it is pumped via a line C into the scrubber 1. Limestone slurry is recycled via a line D from the lower part of the scrubber 1 to nozzles 4, which are located above the inlet of the flue gases and which form a spraying zone scrubbing the flue gases by a countercurrent principle. Calcium carbonate reacts with the sulphur compounds of the flue gases by forming calcium sulphite, which is oxidized into calcium sulphate, i.e. gypsum, because of the oxygen entrained in the flue gases and the forced oxidation taking place in the lower part of the scrubber. Oxidation air is supplied via a line E to the fluid volume in the lower part of the scrubber. In the lower part of the scrubber, a mixer is also provided for admixing oxidation air into the fluid volume. Gypsum slurry is formed on the bottom of the gas scrubber 1 and is led from the bottom of the scrubber via a waste line F into a separator 5. The separator is a hydrocyclone, whose substantially gypsum-free excess is returned as scrubbing fluid via a recovery line G to the scrubber 1. Water is used as a carrier for the scrubbing fluid to carry the materials used and produced in the flue gas scrubbing process. The waste line F and the recovery line G constitute a recycle line to form a water circulation as closed as possible in order to keep the need for fresh water as small as possible. The reject of the hydrocyclone, which is gypsum slurry having a high solid matter content, is directed to a belt filter 6 for dewatering the gypsum further by filtering and from whose surface the gypsum cake is removed for further processing or dumping 7. The scrubbing fluid obtained as a filtrate from the belt filter is recycled further along a line H into the scrubber 1.

According to the invention, to the scrubbing fluid is added, at a suitable point in the process, an auxiliary agent which prevents foaming in the scrubber as well as facilitates the mixing of possibly formed foam into the scrubbing fluid and keeps small particles, such as soot and lubricant residues, in the solution. Furthermore, the auxiliary agent alters the infiltration of the gypsum being formed. The auxiliary agent may be added, for example, directly into the scrubber along a line 1, into the limestone tank 3 along a line J, or into any line D, G or H for recycling the scrubbing fluid into the scrubber. Moreover, the auxiliary agent can be added into any equalizing reservoir or other tank in the cirulation line of the scrubbing fluid, the tank not being shown in the figure for the sake of simplicity. Pilot tests have shown that a relatively small amount of a liquid auxiliary agent is required to achieve the desired reaction. For example, a typical dosage for a 50 $MW_e$ power plant is about 10 ml/h.

The effect of the auxiliary agent on the infiltration of gypsum is very significant. In tests, it has been possible to raise the moisture level of the gypsum cake to be removed from the belt filter even to 20%, wherein the gypsum can still be easily handled in cake form. Without the auxiliary agent, this effect has not been achieved with band filters typically used for dewatering.

Therefore, the auxiliary agent added in the flue gas scrubbing process provides numerous improvements: foaming in the scrubber is prevented, or foam possibly produced in the scrubber can be mixed with the scrubbing fluid, and small particles, such as soot and lubricant residues, as well as soluble impurities in the scrubbing fluid can be removed with the gypsum. All of these can thus be discharged from the scrubbing fluid in a simple and easy way without extra investments for equipment. The gypsum obtained can be utilized, for example, for purposes of earth building.

As mentioned above, the auxiliary agents utilized in the invention are detergents, for example dishwashing liquids., used in households. Consequently, the auxiliary agents are products having cleaning properties and consisting of main components, i.e. surfactants, and normally also auxiliary components, i.e. additives, intensifiers and other auxiliary agents. Pilot tests have shown that particularly suitable auxiliary agents include liquid detergents containing anionic and amphoteric tensides, wherein the content of anionic tensides is 15 to 30% and the content of amphoteric tensides is lower than 5%. It is also possible to use powdered detergents which contain, in addition to the above-mentioned tensides, also zeolites which act as molecular sieves effective in binding fine impurities.

The invention is not intended to be limited to the embodiments presented as examples above, but the invention is intended to be applied widely within the scope of the inventive idea as defined in the appended claims. The term fluid or scrubbing fluid used above refers more generally to water or a corresponding washing water, but the invention is also applicable to be used analogously in such systems, in which the medium carrying different solid or dissolved components is a liquid other than water. Consequently, the term also means a slurry containing solid components.

The invention claimed is:

1. A method for removing impurities accumulated in a scrubbing fluid in a flue gas scrubber, the method comprising:
    introducing an auxiliary agent into the scrubber,
    scrubbing the flue gases with a scrubbing fluid including a calcium-containing absorbent, wherein the auxiliary agent causes impurities in the scrubbing fluid to mix with the scrubbing fluid,
    discharging from the scrubber the scrubbing fluid containing gypsum produced in the scrubber and the impurities, and
    removing from the scrubbing fluid the impurities together with the gypsum.

2. The method according to claim 1, wherein the auxiliary agent comprises anionic and amphoteric tensides.

3. The method according to claim 2, wherein the auxiliary agent comprises zeolites.

4. The method according to claim 1, wherein the auxiliary agent comprises a detergent in the form of a solution or a powder.

5. The method according to claim 1, wherein the impurities accumulated in the scrubbing fluid are foam and particles adhered to it.

6. The method according to claim 1, wherein the impurities accumulated in the scrubbing fluid comprise chlorides and/or fluorides dissolved in the scrubbing fluid.

7. The method according to claim 1, wherein infiltration of the gypsum is changed by the effect of the auxiliary agent.

8. The method according to claim 1, wherein the flue gas scrubber is a flue gas scrubber for a diesel power plant.

9. The method according to claim 5, wherein the particles comprise soot and lubricant residues.

10. The method according to claim 1, wherein the auxiliary agent is introduced directly into the scrubber.

11. The method according to claim 1, further comprising: recycling the scrubbing fluid, wherein the auxiliary agent is introduced into the scrubber by adding the auxiliary agent to the recycled scrubbing fluid prior to introducing the recycled scrubbing fluid into the scrubber.

12. The method according to claim 11, wherein the scrubbing fluid is recycled to the scrubber after removal of the impurities and the gypsum.

13. The method according to claim 1, wherein the auxiliary agent is introduced into the scrubber by adding the auxiliary agent to limestone prior to introducing the limestone into the scrubber.

14. The method according to claim 1, wherein the auxiliary agent is introduced into the scrubber by adding the auxiliary agent to the scrubbing fluid prior to introducing the scrubbing fluid into the scrubber.

* * * * *